United States Patent
Ye (10) Patent No.: US 9,933,922 B2
(45) Date of Patent: Apr. 3, 2018

(54) CHILD CONTAINER CONTROL OF PARENT CONTAINER OF A USER INTERFACE

(71) Applicant: SYBASE, INC., Dublin, CA (US)

(72) Inventor: Xin Ye, Beijing (CN)

(73) Assignee: Sybase, Inc., Dublin, CA (US)

( * ) Notice: Subject to any disclaimer, the term of this patent is extended or adjusted under 35 U.S.C. 154(b) by 666 days.

(21) Appl. No.: 14/226,844

(22) Filed: Mar. 27, 2014

(65) Prior Publication Data

US 2015/0277673 A1    Oct. 1, 2015

(51) Int. Cl.
| | | |
|---|---|---|
| *G06F 3/048* | (2013.01) | |
| *G06F 3/0484* | (2013.01) | |
| *G06F 3/0481* | (2013.01) | |
| *G06F 3/0488* | (2013.01) | |
| *G09G 5/14* | (2006.01) | |

(52) U.S. Cl.
CPC ........ *G06F 3/04842* (2013.01); *G06F 3/0481* (2013.01); *G06F 3/04886* (2013.01); *G09G 5/14* (2013.01); *G06F 2203/04803* (2013.01); *G06F 2203/04806* (2013.01); *G09G 2340/045* (2013.01)

(58) Field of Classification Search
CPC ............. G06F 3/0481; G06F 17/30327; G06F 3/04842; G06F 3/0488; G06F 2203/04803; H04N 21/4316; H04N 21/4438; H04N 21/4396; H04N 21/440263; H04N 21/4532; H04N 21/4667

See application file for complete search history.

(56) References Cited

U.S. PATENT DOCUMENTS

| | | | | |
|---|---|---|---|---|
| 5,900,873 A | * | 5/1999 | Isoda | G09G 5/14 715/794 |
| 5,943,679 A | * | 8/1999 | Niles | G06F 17/212 715/247 |
| 7,536,657 B2 | * | 5/2009 | Shimizu | G06F 3/0481 709/203 |
| 8,607,157 B2 | * | 12/2013 | Shibata | G06F 3/0481 715/781 |
| 2002/0033837 A1 | * | 3/2002 | Munro | G06F 3/0481 345/654 |
| 2002/0196286 A1 | * | 12/2002 | Taylor | G06F 3/0481 715/788 |

(Continued)

FOREIGN PATENT DOCUMENTS

| | | | | |
|---|---|---|---|---|
| KR | 10-2013-0022901 | * | 4/2013 | G06F 19/00 |

OTHER PUBLICATIONS

Debiski et al., Methods of Creating Graphical Interfaces of Web Applications based on the Example of FLEX Framework; IEEE; published on 2010; 4 pages.*

*Primary Examiner* — Linh K Pham
(74) *Attorney, Agent, or Firm* — Jones Day (57) ABSTRACT

Disclosed herein are technologies that give a disproportionate amount of screen real estate (or container real estate) to one of a group of user interface (UI) subcontainers to which a user is giving his or her attention. More particularly, in response to an indication that the user is focused and/or interested on a particular subcontainer, the device enlarges that subcontainer to occupy more (and perhaps all) of the available screen (or container) real estate. This Abstract is submitted with the understanding that it will not be used to interpret or limit the scope or meaning of the claims.

13 Claims, 9 Drawing Sheets

(56) References Cited

U.S. PATENT DOCUMENTS

| Publication No. | Date | Inventor | Classification | Subclass |
|---|---|---|---|---|
| 2004/0252119 A1* | 12/2004 | Hunleth | G06F 3/0482 | 345/440 |
| 2005/0235214 A1* | 10/2005 | Shimizu | G06F 3/0481 | 715/740 |
| 2006/0224992 A1* | 10/2006 | Rossi | G06F 3/0481 | 715/781 |
| 2009/0064035 A1* | 3/2009 | Shibata | G06F 3/0481 | 715/803 |
| 2009/0164887 A1* | 6/2009 | Ikegami | G06F 17/30905 | 715/247 |
| 2009/0287996 A1* | 11/2009 | Norimatsu | G06T 11/00 | 715/243 |
| 2010/0180222 A1* | 7/2010 | Otsuka | G06F 3/0482 | 715/768 |
| 2011/0167368 A1* | 7/2011 | Murakami | G06F 3/0481 | 715/767 |
| 2011/0202872 A1* | 8/2011 | Park | G06F 3/0481 | 715/790 |
| 2011/0225522 A1* | 9/2011 | Kamiyama | G06F 8/34 | 715/762 |
| 2011/0279388 A1* | 11/2011 | Jung | G06F 3/04883 | 345/173 |
| 2011/0302528 A1* | 12/2011 | Starr | G06F 9/4443 | 715/800 |
| 2013/0086458 A1* | 4/2013 | Kurata | G06T 11/60 | 715/202 |
| 2013/0305150 A1* | 11/2013 | Budavari | G06F 17/211 | 715/277 |
| 2014/0164993 A1* | 6/2014 | Chang | G06F 3/0485 | 715/800 |
| 2014/0325428 A1* | 10/2014 | Lee | G06F 3/0481 | 715/781 |
| 2014/0354561 A1* | 12/2014 | Kim | G06F 3/005 | 345/173 |
| 2016/0012188 A1* | 1/2016 | Chung | G06F 3/0481 | 705/2 |

\* cited by examiner

CHILD CONTAINER CONTROL OF PARENT CONTAINER OF A USER INTERFACE

TECHNICAL FIELD

The present disclosure relates generally to a user interface technology.

BACKGROUND

Application software is a computer-executable program that directs a computer (e.g., personal computer, tablet computer, smartphone, etc.) to perform useful tasks for the benefit of the end user of the computer. Typically, application software is not involved in merely operating the computer itself. Individual application software packages are often called simply an application or an app.

Typically, an app has a user interface (UI) that allows a user (i.e., human) to interact with an application and the computer/network associated with that application. Many apps have a graphical user interface (i.e., graphical UI or GUI), which is a type of user interface that allows users to interact with electronic devices through graphical icons and visual indicators.

A GUI typically includes UI control objects, which may be called UI controls or UI elements. Examples of UI controls include buttons, lists, and text fields. UI controls are commonly used for organizing content displayed in the GUI, for providing a mechanism for user navigation and input, for notifying about app status change, and/or other such events and actions. A collection or composite of UI controls may be called a UI component herein.

An app developer may use a UI container to organize the various UI components of their application. By using a layout, a UI container manages the positioning and size of any UI component that it contains. Typically, any controls that are added to a container are known as children. A container can also contain other containers, called sub-containers. A display may show one or more containers concurrently.

Typically, a container specifies a layout model. The layout model defines how UI controls therein are organized, arranged, and repositioned, within the parent container. The layout model definition is a useful method of automatically arranging controls without a programmer hard-coding the relative position of a control and without the programmer worrying about the details of the physical device. This is because the device, using the layout model, automatically determines the preferred size and position of each control in the container, depending on the ideal size of the control and the amount of available space within the parent container. Letting the layout model definition automatically position and place the UI controls increases the chance that the application will appear correctly regardless of device type or screen size.

Due to mobile screen-size limitation (especially phone screen size), a UI programmer/designer has a challenge in optimizing the UI layout of mobile application. Conventionally, there is an optimization for the unused space in the container area. An example is the Flexible Box (or flex container or "flexbox") layout model in cascade style sheet (CSS) standard. The children of a flex container can "flex" their sizes, either growing to fill unused space or shrinking to avoid overflowing the parent. Both horizontal and vertical alignment of the children can be easily manipulated. Nesting of these boxes (horizontal inside vertical or vertical inside horizontal) can be used to build layouts in two dimensions.

Figure 1:
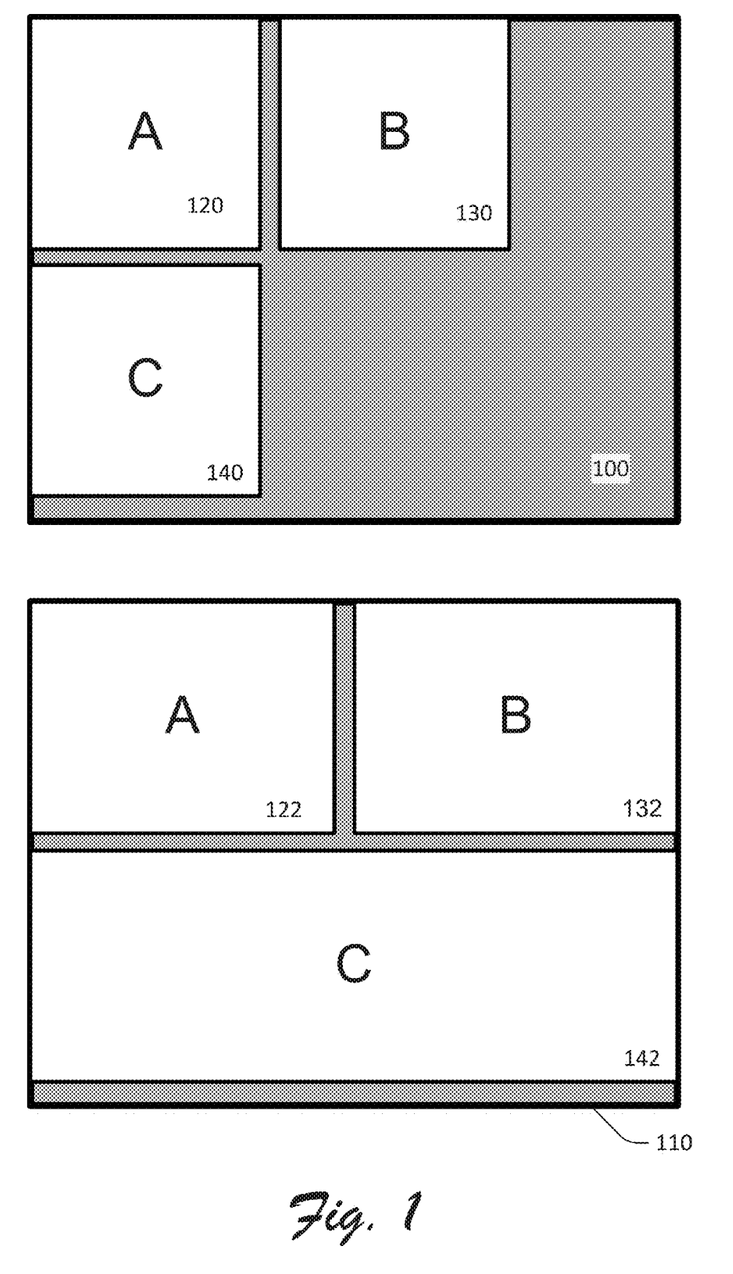
FIG. 1 illustrates an example container-based user interface with children containers.

FIG. 1 shows an example conventional container 100 shown on similarly sized screen of a device (not shown). Herein, the space available in the container is called the container real estate. Similarly, the space available in the screen is the screen real estate. If the container and the screen are coextensive, then the container and screen real estate match.

The container 100 has three children containers 120, 130, and 140. Each child container is approximately the same size. The size of the children containers is not optimized for the screen size. Consequently, there is much unused space on the screen.

FIG. 1 also shows an example conventional flex container 110 shown on similarly sized screen of a device (not shown). The flex container 110 has three children flex containers 122, 132, and 142. The size of each child flex container is adjusted to fill-up the unused space of the flex container 110. Unlike the children containers of container 100, the size and shape of the children flex containers are optimized for the screen size.

BRIEF SUMMARY

Disclosed herein are technologies that give a disproportionate amount of screen real estate (or container real estate) to one of a group of user interface (UI) subcontainers to which a user is giving his or her attention. More particularly, in response to an indication that the user is focused and/or interested on a particular subcontainer, the device enlarges that subcontainer to occupy more (and perhaps all) of the available screen (or container) real estate.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

With regard to user interfaces (UIs), conventional flex containers are effective in utilizing otherwise unused "real estate" (or space) on a screen. Unfortunately, conventional flex containers are static. They do not respond to how a user actually uses and/or interacts with the sub-containers.

Typically, a person can only focus on one part of the whole area at one time. As a result, the other parts outside the focus are ignored. Based upon this understanding, the technology described herein emphasizes (e.g., enlarges) the focused parts of the UI while deemphasizing (e.g., shrinking or hiding) the other parts. In particular, the parts are subcontainers or a UI container.

Disclosed herein are technologies that give a disproportionate amount of screen real estate (or container real estate) to one of a group of user interface (UI) subcontainers to which a user is giving his or her attention. More particularly, in response to an indication that the user is focused and/or interested on a particular subcontainer, the device enlarges that subcontainer to occupy more (and perhaps all) of the available screen (or container) real estate. Consequently, the other (i.e., non-focused) subcontainers are reduced or eliminated.

Herein, the subcontainer (or child container) to which the user is presently giving his or her attention is called the "focus" subcontainer or child container. Conversely, the subcontainers (or child containers) to which the user is not presently giving his or her attention are called the "non-focus" subcontainers or child containers.

When a person's attention changes to another subcontainer, then that subcontainer is the focus subcontainer and the others are the non-focus subcontainer. Consequently, the focus subcontainer is enlarged and the others are reduced. In some implementations, the shift in attention results in a home or base arrangement of subcontainers to be displayed.

Figure 2:
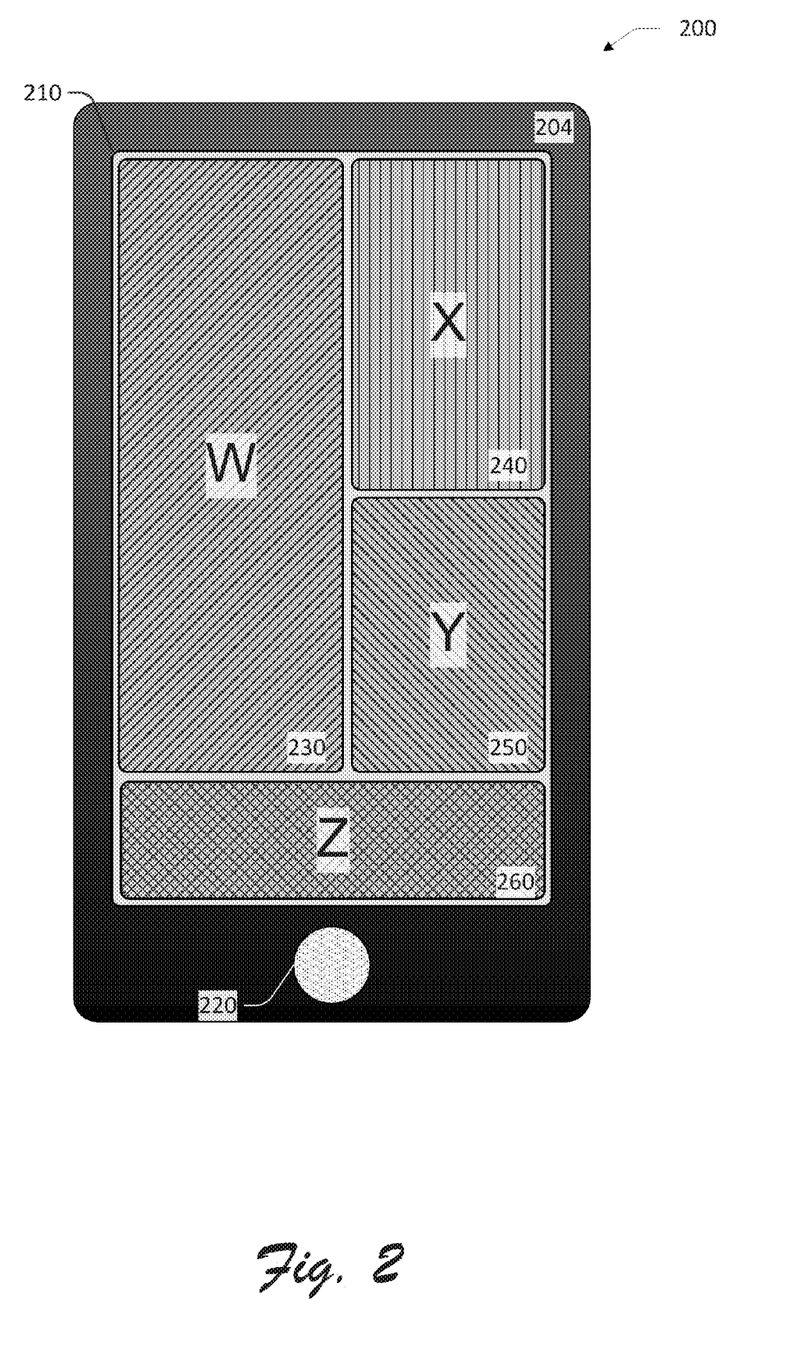
FIGS. 2-6 show device using an example container-based user interface with children containers in accordance with the technology described herein.

FIG. 2 shows a depiction 200 that includes a smartphone 204 with a screen 210 and a home button 220. A UI is displayed on the screen 210. The UI includes a single parent container that is coextensive with the screen. That is, the container matches the screen 210 in shape and size.

Since this single-parent-container-being-co-extensive-with-the-screen scenario is the example depicted, the most likely scenario, and the easiest to describe, this scenario is presumed herein in this document and the term screen real estate refers to the available space of both the parent container and the screen. Of course, in alternative implementations one or more containers may be displayed on a screen. Therefore, if the context indicates that an alternative scenario is contemplated then the real estates of the screen and parent container is not the same.

The parent container of the screen 210 includes four example subcontainers (or child containers). Presumably, each subcontainer is defined by a layout model and will include various UI components, such as buttons and text input boxes.

To identify these subcontainers, they are labeled with a letter. In particular, they are labeled W, X, Y, and Z. To distinguish the presentation or arrangement of the particular subcontainers from each other and from other yet-to-be-discussed arrangements of these same subcontainers, each subcontainer is numbered to indicate its particular arrangement in a given depiction. Consequently, in FIG. 2, the subcontainer W is also labeled 230, the subcontainer X is also labeled 240, the subcontainer Y is also labeled 250, the subcontainer Z is also labeled 260. For the discussion herein, this arrangement of the subcontainers may be called the "home" or original arrangement.

Figure 3:
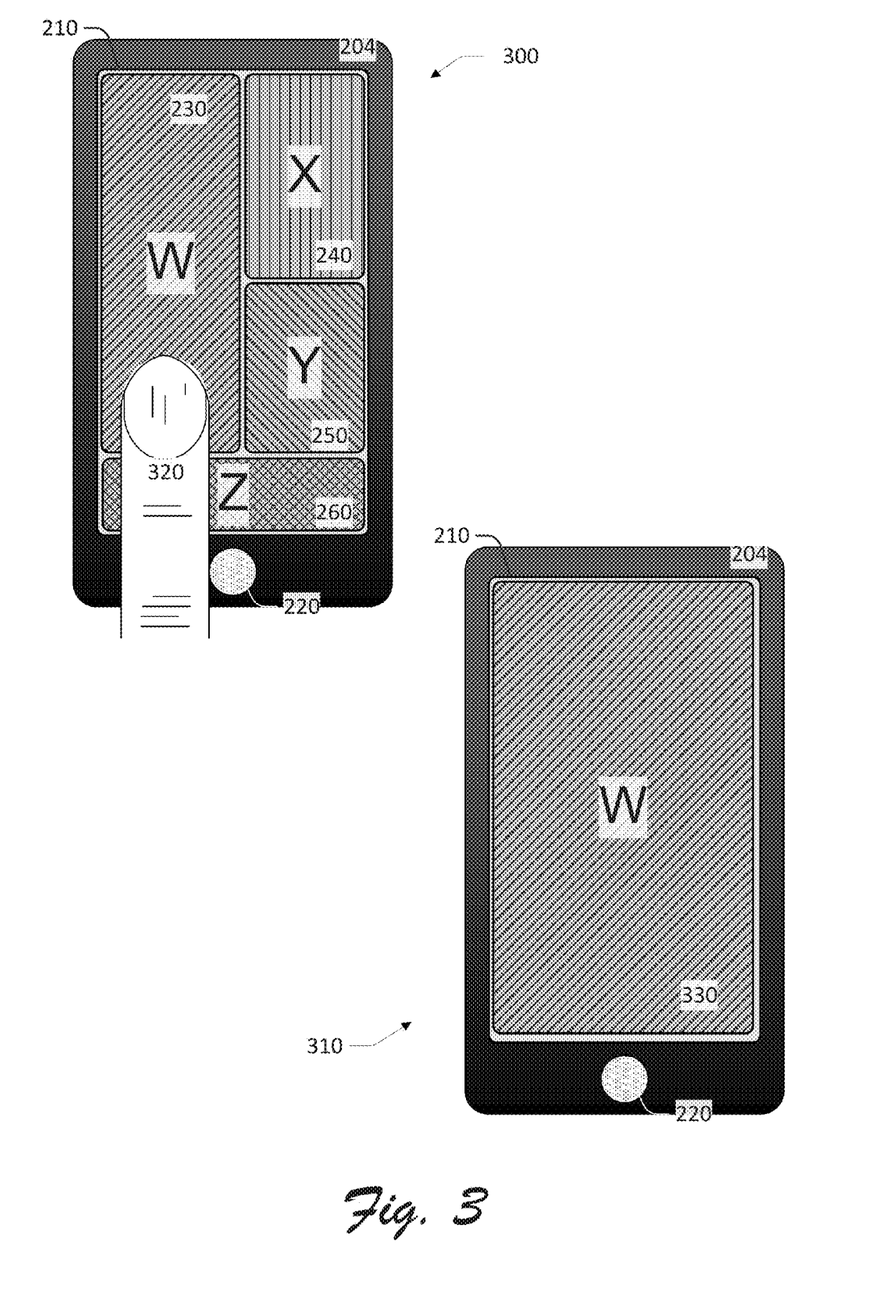

FIG. 3 shows a depiction 300 with the smartphone 204. Depiction 300 shows a user's finger 320 interacting with the touchscreen of the smartphone 204. More particularly, the user is touching subcontainer W 230. The subcontainers are in their home arrangement. Depiction 310 shows an example response to that touch. Presumably, the touch indicates or triggers the user's focus on subcontainer W.

In response to the user's selection of subcontainer W, that subcontainer becomes the focus subcontainer and the others (X, Y, and Z) are non-focus subcontainers. In this implementation and as shown in depiction 310, subcontainer W enlarges to arrangement 330, which occupies all of the available real estate of the screen 210. The other subcontainers are hidden and thus disappear.

Figure 4:
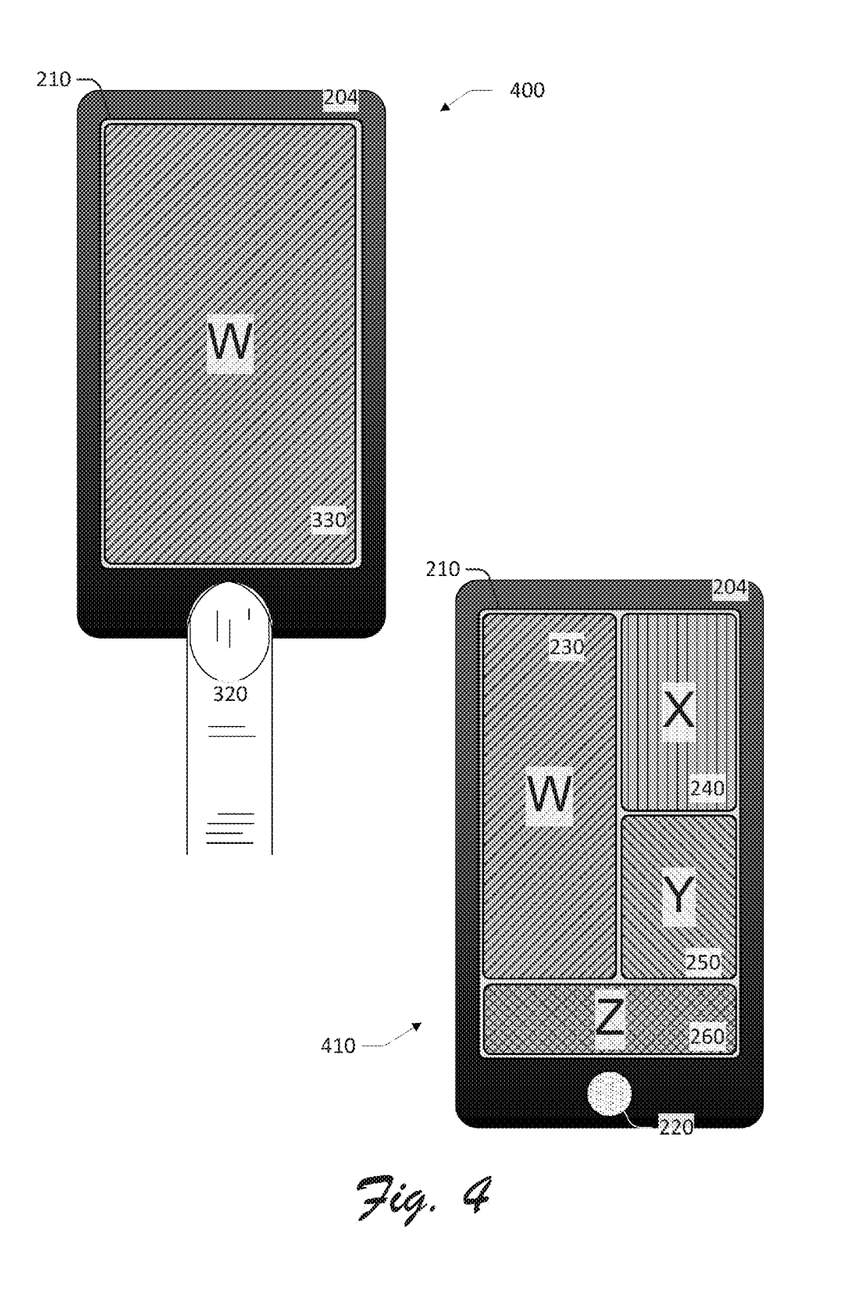

FIG. 4 shows depiction 400 that is identical to depiction 300 except the user's finger 320 is pressing the home button (which is obstructed from view in depiction 400). The pressing of the home button may be an indication that the user is no longer interested in subcontainer W in its emphasized arrangement 330. In response, the subcontainers return to their home arrangement. This is shown in depiction 410. Subcontainer W shrinks back to its original size and location of 230. The other subcontainers reappear and take their original sizes and locations of 240, 250, and 260.

Figure 5:
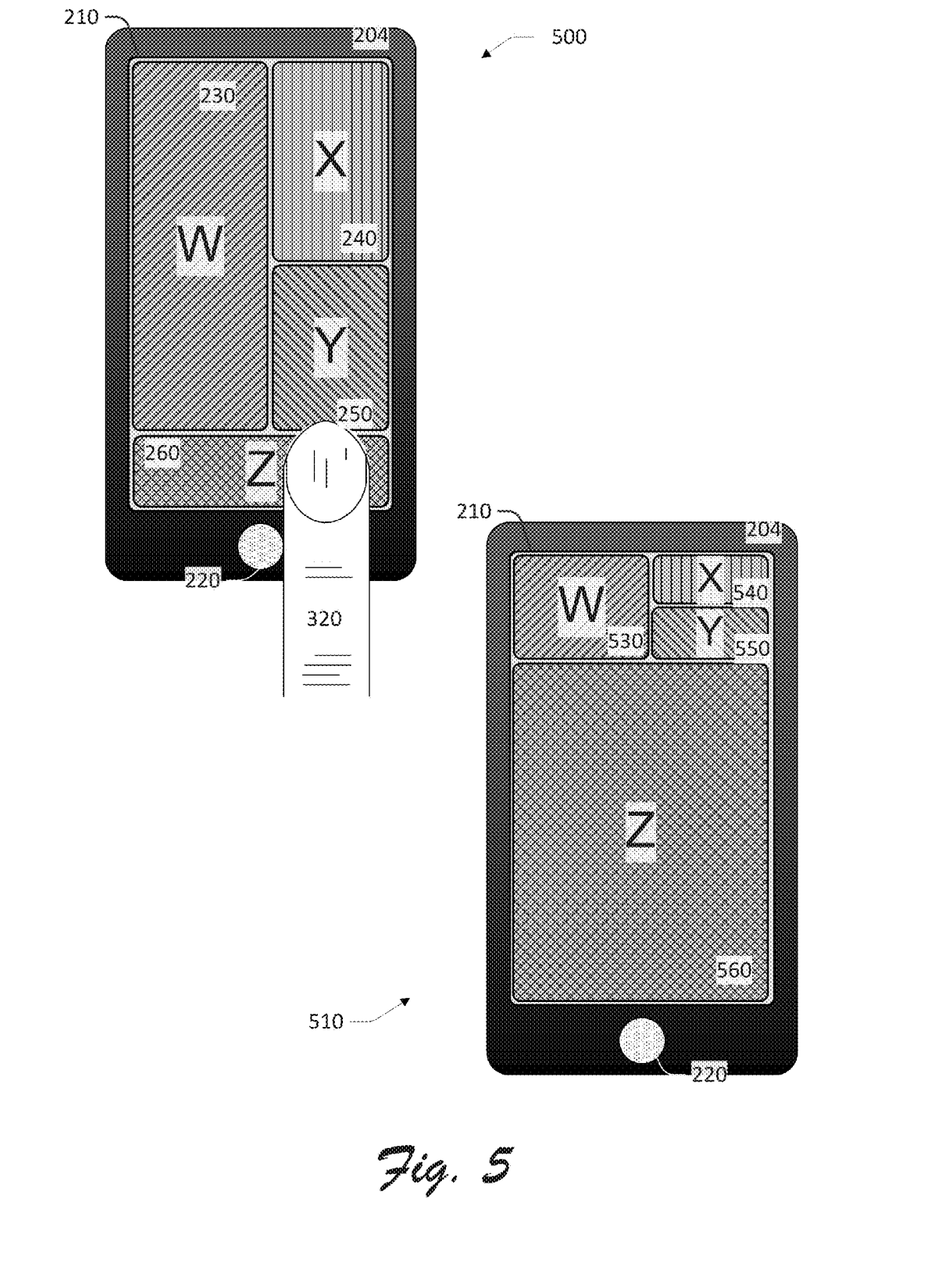
Figure 6:
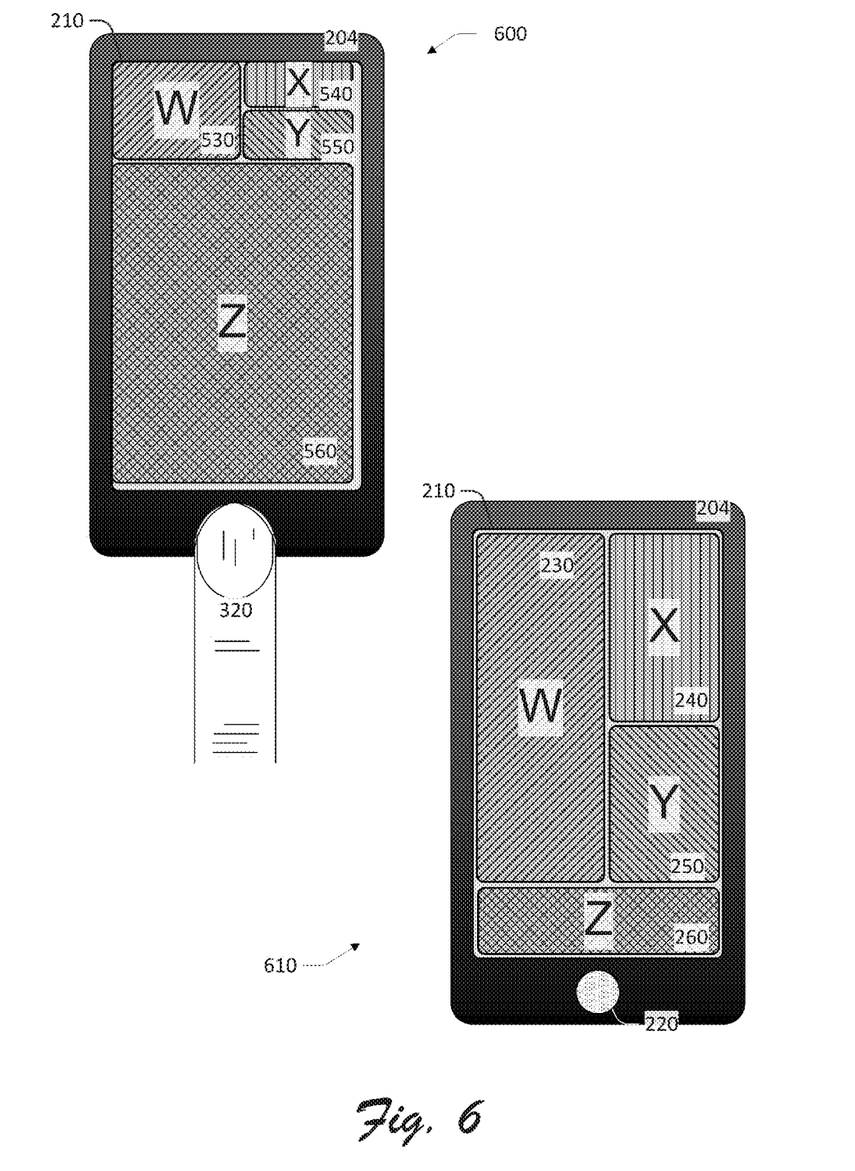

FIGS. 5 and 6 illustrate another implementation of the technology described herein. FIG. 5 shows a depiction 500 with the smartphone 204. Depiction 500 shows a user's finger 320 interacting with the touchscreen of the smartphone 204. More particularly, the user is touching subcontainer Z 260. The subcontainers are in their home arrangement. Depiction 510 shows an example response to that touch. Presumably, the touch indicates or triggers the user's focus on subcontainer Z.

In response to the user's selection of subcontainer Z, that subcontainer becomes the focus subcontainer and the others (X, Y, and W) are non-focus subcontainers. In this implementation and as shown in depiction 510, subcontainer Z enlarges to arrangement 560, which occupies less than all of the available real estate of the screen 210. The other subcontainers shrink but do not entirely disappear. Their arrangement is shown as subcontainers W 530, X 540, and Y 550.

FIG. 6 shows depiction 600 that is identical to depiction 510 except the user's finger 320 is pressing the home button (which is obstructed from view in depiction 600). The pressing of the home button may be an indication that the user is no longer interested in subcontainer Z in its emphasized arrangement 560. In response, the subcontainers return to their home arrangement. This is shown in depiction 610. Subcontainer Z shrinks back to its original size and location of 260. The other subcontainers enlarge and take their original sizes and locations of 230, 240, and 250.

Of course, a press of the home button 220 is just one way that the user indicates his or her desire to return to the home arrangement. Alternative indications or triggers may include, for example, double tap, a long press, orientation of the smartphone, touching a particular area of the focus subcontainer, receiving any input via the focus subcontainer or some particular input, a timer expiring, and movement of the smartphone 204. Also, any of these alternatives to the home button press may also be alternatives for the indication of interest in a particular subcontainer.

In addition, in other alternative implementations, the device might not return to the home arrangement. Rather, the device may cycle through the active subcontainers. In this way, the focus subcontainer role may be rotated amongst the active subcontainers.

Alternatively, a container may have multiple such containers therein. In other words, a subcontainer may itself have both focus and non-focus containers therein. This may be thought of as a nested arrangement of such containers.

Figure 7:
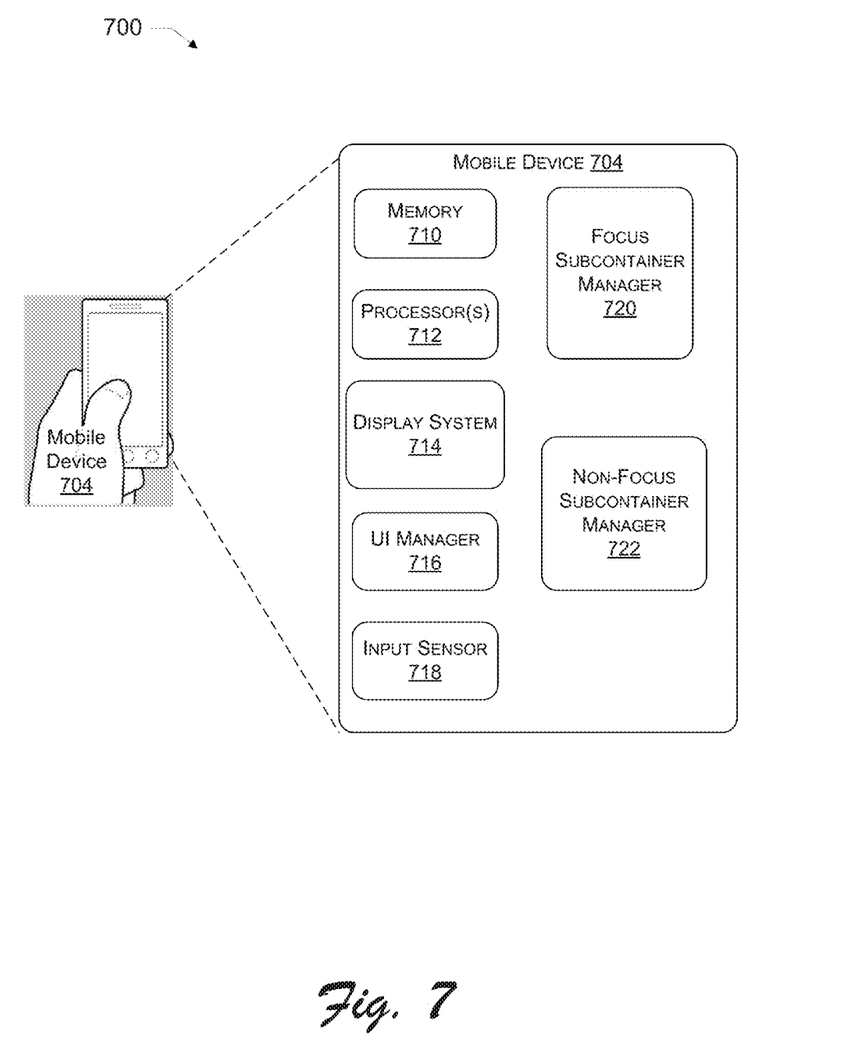
FIG. 7 shows an example system in accordance with the technology described herein.

FIG. 7 illustrates example system 700 for implementing the technology described herein. The system 700 includes a mobile device 704.

The mobile device 704 includes a memory 710, one or more processor(s) 712, a display system 714, a UI manager 716, an input sensor 718, a focus subcontainer manager 720, and a non-focus subcontainer manager 722. These functional components can be separate or some combination of hardware units. Alternatively, the components can be implemented, at least in part, in software and thus be stored in the memory 710 and executed by the processors 712.

The display system 714 includes the display itself (such as the screen 210) and the graphics system to drive that display. The UI manager 716 manages the UI of the mobile device. The UI manager 716 generates the graphics for the UI. The UI includes one or more parent containers.

The input sensor 718 detects input from a user or from some other source. It also sends triggers for switch of focus subcontainers. Input may be from the user such as a tap on a particular subcontainer, a double tap, a long press, a change in orientation of the smartphone, pressing the home button, touching a particular area of the focus subcontainer, receiving any input via a subcontainer or some particular input, a timer expiring, and particular movement of the device.

Based upon the input, the focus subcontainer manager 720 selects a particular one of the subcontainers as the focus subcontainer. The other subcontainers are the non-focus containers. The focus subcontainer manager 720 emphasizes the focus subcontainer. Typically, that involves enlarging the focus subcontainer.

The non-focus subcontainer manager 722 de-emphasizes the non-focus subcontainers. Typically, that involves reducing or hiding the non-focus subcontainers.

Working together, the focus subcontainer manager 720 and the non-focus subcontainer manager 722 restore the home arrangement of the subcontainers in response to an appropriate trigger. The trigger may be input such as a tap on a particular subcontainer, a double tap, a long press, a change in orientation of the smartphone, pressing the home button, touching a particular area of the focus subcontainer, receiving any input via a subcontainer or some particular input, a timer expiring, and particular movement of the device.

In this example, the mobile device 704 is depicted and described as a smartphone. Of course, other options exist for other implementations. Instead of a smartphone, the mobile device 704 may be a tablet computer, desktop computer, laptop computer, a phablet, a personal digital assistant (PDA), navigational device, or any other devices that uses a container-based UI system.

Figure 8:
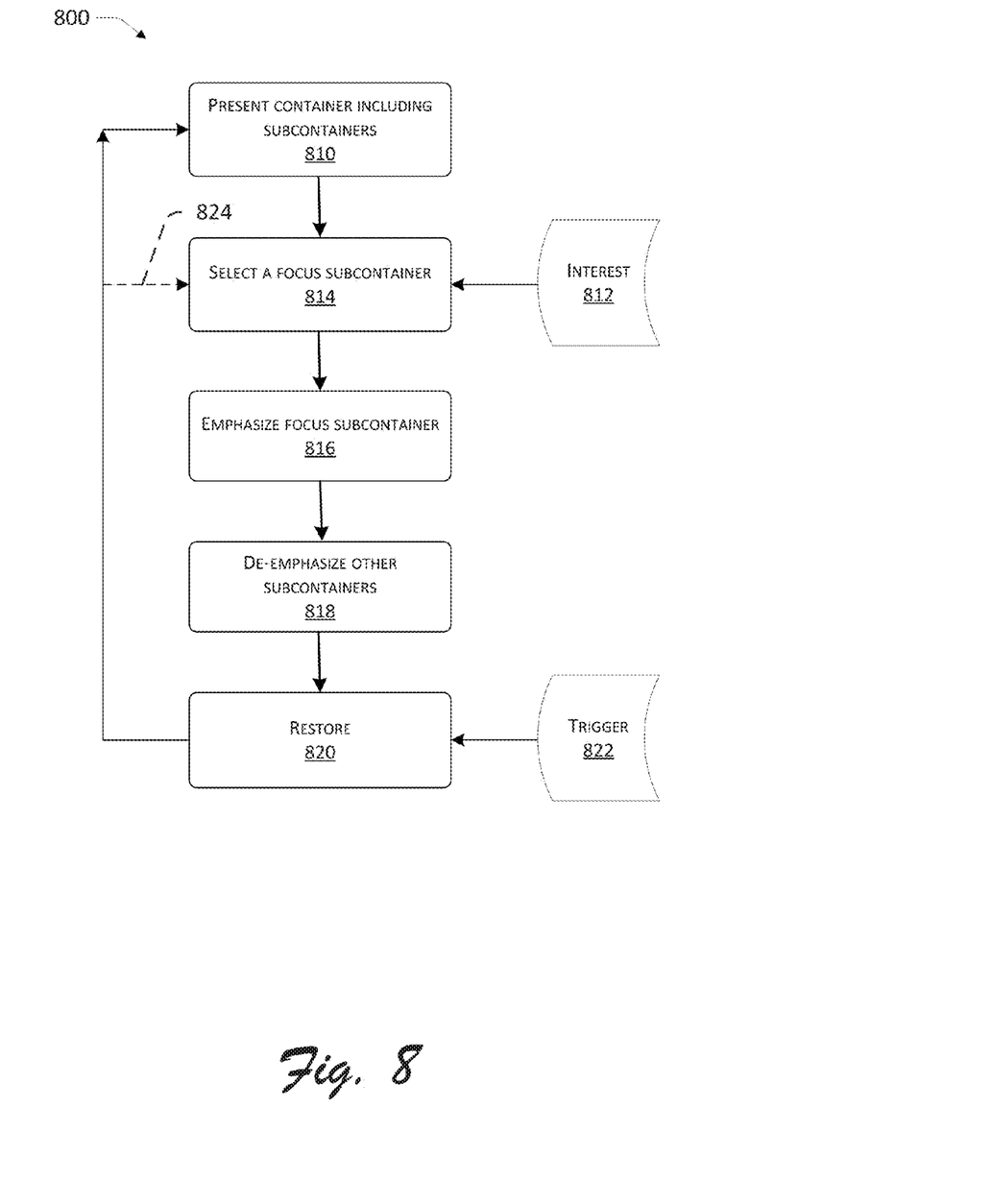
FIG. 8 illustrates an exemplary process in accordance with the technology described herein.

FIG. 8 illustrates an exemplary process 800 for implementing, at least in part, the technology described herein. In particular, process 800 depicts an operation of the example system 700. The process 800 is performed by, for example, the mobile device 704, the system 700, or some other suitable computing system.

At 810, the device presents a UI on a screen of the computing device. More particularly, the UI includes a parent container with a home arrangement of subcontainers (like that shown in FIG. 2).

Block 812 represents an indication that user has a particular interest in one of the subcontainers. That indication may be input from the user such as a tap on a particular subcontainer, a double tap, a long press, a change in orientation of the smartphone, pressing the home button, touching a particular area of the focus subcontainer, receiving any input via a subcontainer or some particular input, a timer expiring, and particular movement of the device.

At 814, the device selects a particular one of the subcontainers as the focus subcontainer. The other subcontainers are the non-focus subcontainers.

At 816, the device emphasizes the focus subcontainer. Typically, that involves enlarging the focus subcontainer.

At 818, the device de-emphasizes the non-focus subcontainers. Typically, that involves reducing or hiding the non-focus subcontainers.

At 820, in response to a trigger 822, the device restores the home arrangement of the subcontainers. Consequently, the process 800 returns to the first block at 810. The trigger 822 may be input such as a tap on a particular subcontainer, a double tap, a long press, a change in orientation of the smartphone, pressing the home button, touching a particular area of the focus subcontainer, receiving any input via a subcontainer or some particular input, a timer expiring, and particular movement of the device.

Alternatively, instead of restoring the home arrangement, the focus subcontainer may cycle through the group of subcontainers. This alternative is shown by dashed line 824.

Figure 9:
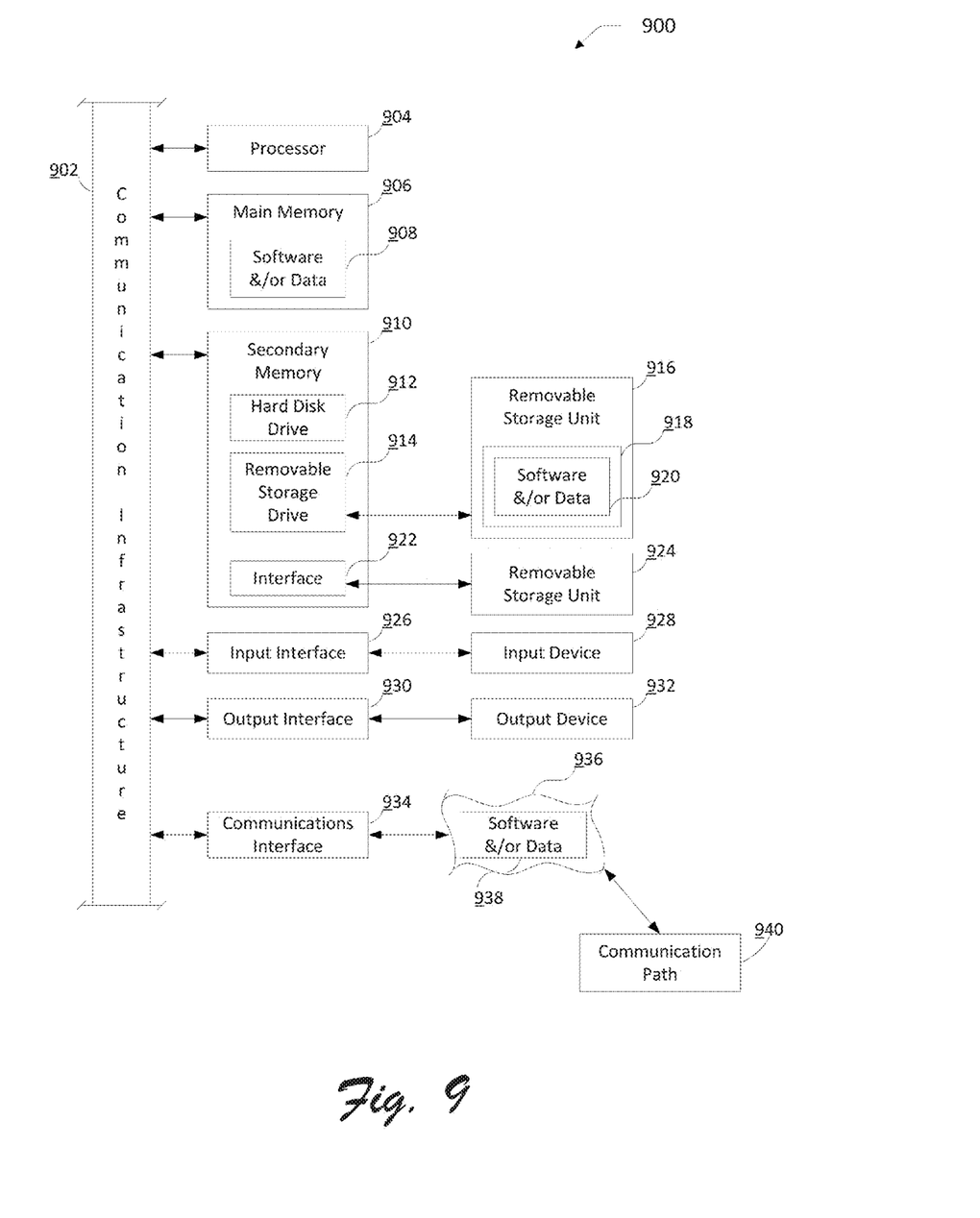
FIG. 9 illustrates an exemplary computing system to implement in accordance with the technologies described herein.

FIG. 9 illustrates an exemplary system 900 that may implement, at least in part, the technologies described herein. The computer system 900 includes one or more processors, such as processor 904. Processor 904 can be a special-purpose processor or a general-purpose processor. Processor 904 is connected to a communication infrastructure 902 (for example, a bus or a network). Depending upon the context, the computer system 900 may also be called a client device.

Computer system 900 also includes a main memory 906, preferably Random Access Memory (RAM), containing possibly inter alia computer software and/or data 908.

Computer system 900 may also include a secondary memory 910. Secondary memory 910 may include, for example, a hard disk drive 912, a removable storage drive 914, a memory stick, etc. A removable storage drive 914 may include a floppy disk drive, a magnetic tape drive, an optical disk drive, a flash memory, or the like. The removable storage drive 914 reads from and/or writes to a removable storage unit 916 in a well-known manner. A removable storage unit 916 may include a floppy disk, a magnetic tape, an optical disk, etc. which is read by and written to by removable storage drive 914. As will be appreciated by persons skilled in the relevant art(s), removable storage unit 916 includes a computer usable storage medium 918 having stored therein possibly inter alia computer software and/or data 920.

In alternative implementations, secondary memory 910 may include other similar means for allowing computer-program products or other instructions to be loaded into computer system 900. Such means may include, for example, a removable storage unit 924 and an interface 922. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 924 and interfaces 922 which allow software and data to be transferred from the removable storage unit 924 to computer system 900.

Computer system 900 may also include an input interface 926 and a range of input devices 928 such as, possibly inter alia, a keyboard, a mouse, etc.

Computer system 900 may also include an output interface 930 and a range of output devices 932 such as, possibly inter alia, a display, one or more speakers, etc.

Computer system 900 may also include a communications interface 934. Communications interface 934 allows software and/or data 938 to be transferred between computer system 900 and external devices. Communications interface 934 may include a modem, a network interface (such as an Ethernet card), a communications port, a Personal Computer Memory Card International Association (PCMCIA) slot and card, or the like. Software and/or data 938 transferred via communications interface 934 are in the form of signals 936 which may be electronic, electromagnetic, optical, or other signals capable of being received by communications interface 934. These signals 936 are provided to communications interface 934 via a communications path 940. Communications path 940 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 916, removable storage unit 924, and a hard disk installed in hard disk drive 912. Computer-program medium and computer-usable medium can also refer to memories, such as main memory 906 and secondary memory 910, which can be memory semiconductors (e.g. Dynamic Random Access Memory (DRAM) elements, etc.). These computer program products are means for providing software to computer system 900.

Computer programs (also called computer control logic) are stored in main memory 906 and/or secondary memory 910. Such computer programs, when executed, enable computer system 900 to implement the present technology described herein. In particular, the computer programs, when executed, enable processor 904 to implement the processes of aspects of the above. Accordingly, such computer programs represent controllers of the computer system 900. Where the technology described herein is implemented, at least in part, using software, the software may be stored in a computer program product and loaded into computer system 900 using removable storage drive 914, interface 922, hard disk drive 912 or communications interface 934.

The technology described herein may be implemented as computer program products comprising software stored on any computer-useable medium. Such software, when executed in one or more data processing devices, causes data processing device(s) to operate as described herein. Embodiments of the technology described herein may employ any computer useable or readable medium, known now or in the future. Examples of computer-useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-executable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of processor-executable instructions contained in or on a non-transitory computer-readable storage medium. Those processor-executable instructions may then be read and executed by one or more processors to enable performance of the operations described herein. The processor-executable instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. Processor-executable instructions may also be called computer-executable instructions herein. A computer-program product, as used herein, include one or more computer-readable media of program-executable instructions.

What is claimed is:

1. A method that facilitates container control of a user interface (UI), the method comprising:
   presenting a UI on a screen of a mobile device, the UI including a parent container that uses all or a portion of the screen, the parent container having multiple children containers therein and each of the multiple children containers has a defined real estate that each child container occupies within the parent container, wherein the multiple children containers are flex containers in which the size and shape of the multiple children flex containers are configured according to the screen of the mobile device;
   determining whether a user has an interest in one of the multiple children containers, wherein the determining includes receiving input from the user associated with the selected child container, wherein the input comprises a touch input interacting with the screen of the mobile device; and
   in response to the determination:
   selecting one of the multiple children containers that the user has a determined interest therein,
   emphasizing the selected child container, wherein the emphasizing includes increasing the real estate that the selected child container occupies within the parent container, wherein the emphasizing includes enlarge the real estate of the selected child container so that it occupies all of the real estate of the parent container; and
   de-emphasizing the children containers other than the selected child container, wherein the children containers other than the selected child container are rotated through after a deselection of the selected child container and the de-emphasizing includes reducing the real estate that each of the non-selected children containers occupies within the parent container.

2. The method according to claim 1 further comprising restoring the children containers to their defined real estate.

3. The method according to claim 1 further comprising: obtaining a restoration trigger; in response to the trigger, restoring the children containers to their defined real estate.

4. The method according to claim 1 wherein the touch input is selected from a group consisting of a tap on the screen, a double tap on the screen, a long press on the screen, a change in orientation of the mobile device, and a keypress of an off-screen button on the mobile device.

5. The method according to claim 1, wherein the parent container real estate is coextensive with real estate of the screen.

6. A non-transitory computer-readable medium having stored thereon a program code, the program code executable by a computer to perform operations that facilitates container control of a user interface (UI), the operations comprising:
   presenting a UI on a screen of a mobile device, the UI including a parent container that uses all or a portion of the screen, the parent container having multiple children containers therein and each of the multiple children containers has a defined real estate that each child container occupies within the parent container, wherein the multiple children containers are flex containers in which the size and shape of the multiple children flex containers are configured according to the screen of the mobile device;
   determining whether a user has an interest in one of the multiple children containers, wherein the determining comprises receiving a touch input from the user associated with the selected child container that includes a keypress of an off-screen button on the computing device; selecting one of the multiple children containers;
   enlarging the selected child container, wherein the enlarging includes increasing the real estate that the selected child container occupies within the parent container; and
   reducing the children containers other than the selected child container, wherein the reducing includes decreasing the real estate that each of the non-selected children containers occupies within the parent container.

7. The non-transitory computer-readable medium according to claim 6, the operations further comprising:
   determining whether a user has an interest in one of the multiple children containers; and in response to the determination, performing the selecting, enlarging, and reducing operations, wherein the selected child container is the child container in which the user is determined to have an interest.

8. The non-transitory computer-readable medium according to claim 6, the operations further comprising: obtaining a restoration trigger; in response to the trigger, restoring the children containers to their defined real estate.

9. The non-transitory computer-readable medium according to claim 6, wherein the reducing includes hiding the non-selected children containers from view.

10. An apparatus that facilitates container control of a user interface (UI), the apparatus comprising:
    one or more processors; one or more memory modules;
    a UI manager configured to present a UI on a screen of a mobile device, the UI including a parent container that uses all or a portion of the screen, the parent container having multiple children containers therein and each of the multiple children containers has a defined real estate that each child container occupies within the parent container wherein the multiple children containers are flex containers in which the size and shape of the multiple children flex containers are configured according to the screen of the mobile device;
    an input sensor is configured to receive input from a user, wherein the input comprises a change in orientation of the screen of the mobile device:
    a focus subcontainer manager configured to: select one of the multiple children containers, and
    enlarge the selected child container, wherein the enlarging includes increasing the real estate that the selected child container occupies within the parent container; and
    a non-focus subcontainer manager configured to reduce the children containers other than the selected child container, wherein the reducing includes decreasing the real estate that each of the non-selected children containers occupies within the container.

11. The apparatus according to claim 10, wherein the input sensor is configured to determine whether the user has an interest in one of the multiple children containers; the focus subcontainer manager is further configured to select and enlarge in response to the determination, wherein the selected child container is the child container in which the user is determined to have an interest; and the non-focus subcontainer manager is further configured to reduce in response to the determination.

12. The apparatus according to claim 10, wherein an input sensor is configured to obtain a restoration trigger and the focus subcontainer manager and the non-focus subcontainer manager are further configured to, in response to the trigger, restore the children containers to their defined real estate.

13. The apparatus according to claim 10, wherein the reduction performed by the non-focus subcontainer manager includes hiding the non-selected children containers from view.

\* \* \* \* \*